(12) United States Patent
Lin et al.

(10) Patent No.: US 12,292,278 B2
(45) Date of Patent: May 6, 2025

(54) METHOD, SYSTEM, DEVICE AND MEDIUM FOR MEASURING GEAR TOOTH PROFILE ROUGHNESS

(71) Applicant: BEIJING UNIVERSITY OF TECHNOLOGY, Beijing (CN)

(72) Inventors: Jiachun Lin, Beijing (CN); Xinyu Fan, Beijing (CN); Peng Wang, Beijing (CN); Yunfei Li, Beijing (CN); Baofeng He, Beijing (CN); Zhaoyao Shi, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 181 days.

(21) Appl. No.: 18/214,816

(22) Filed: Jun. 27, 2023

(65) Prior Publication Data

US 2024/0369342 A1   Nov. 7, 2024

(30) Foreign Application Priority Data

May 5, 2023   (CN) .......................... 202310492007.9

(51) Int. Cl.
*G01M 13/021*   (2019.01)
*G01B 5/20*   (2006.01)

(52) U.S. Cl.
CPC ........... *G01B 5/202* (2013.01); *G01M 13/021* (2013.01)

(58) Field of Classification Search
CPC .......................... G01B 5/202; G01M 13/021
See application file for complete search history.

(56) References Cited

U.S. PATENT DOCUMENTS

2024/0084882 A1* 3/2024 Lindenbaum ........... F16H 55/08

* cited by examiner

*Primary Examiner* — Eric S. McCall
(74) *Attorney, Agent, or Firm* — Carter, DeLuca & Farrell LLP

(57) ABSTRACT

The present disclosure provides a method, a system, a device and a medium for measuring gear tooth profile roughness. The method includes: obtaining design parameters of a target gear pair and test parameters of each tooth profile working point; fitting a measured surface profile and a theoretical tooth profile curve to obtain a surface structure curve; calculating a Hertzian contact width according to the design parameters and the test parameters for each tooth profile working point on the theoretical tooth profile curve, and determining an evaluation length of surface roughness according to the Hertzian contact width; filtering the surface structure curve by means of a filter with a set wavelength to obtain a surface roughness profile; and determining surface roughness parameters of each tooth profile working point in a working area according to the surface roughness profile for each evaluation length.

19 Claims, 6 Drawing Sheets

Basic gear parameter
Modulus 4.5mm
Tooth number 24
Addendum modification coefficient 0.1715
Transverse pressure angle 20°
Working pressure angle 22.44°
Spiral angle 0°
Tip diameter 118.36mm
Base diameter 101.49
Roughness characterization result

| Roll angle (°) | Ra (μm) | Rq (μm) |
|---|---|---|
| 12.1 | 0.218601 | 0.233965 |
| 12.103 | 0.219362 | 0.234652 |
| 12.106 | 0.219977 | 0.235164 |
| ...... | ...... | ...... |
| 30.589 | 0.19866 | 0.225431 |
| 30.59 | 0.197978 | 0.224862 |
| 30.591 | 0.19741 | 0.224442 |

FIG. 8

METHOD, SYSTEM, DEVICE AND MEDIUM FOR MEASURING GEAR TOOTH PROFILE ROUGHNESS

CROSS REFERENCE TO RELATED APPLICATION

This patent application claims the benefit and priority of Chinese Patent Application No. 2023104920079, filed on May 5, 2023, the disclosure of which is incorporated by reference herein in its entirety as part of the present application.

TECHNICAL FIELD

The present disclosure relates to the technical field of precise measurement on gears, in particular to a method, a system, a device and a medium for measuring gear tooth profile roughness.

BACKGROUND

The gear pair is a basic mechanism composed of two meshed gears. During the meshing process of the gear pair, the gear surface roughness has an important influence on transmission performances such as gear lubrication, tooth surface wear and fatigue. Therefore, the measurement of the tooth surface roughness is of great significance for predicting the working state of a gear contact area.

At present, the measurement and characterization of the tooth surface roughness are generally performed within the range of working tooth height of a tooth profile. As the acceptance content of gear accuracy, the processing mode and working state of the tooth surface are not considered. However, due to the tooth surfaces processed in different processing methods having a different tooth surface roughness in different areas and the change of the tooth surface roughness being non-uniform during the service process of gears, the existing characterization methods of surface roughness are not completely consistent with the actual situation in the calculation of gear contact stress, lubrication state and tooth surface wear, which cannot meet the needs of gear contact analysis.

SUMMARY

The present disclosure aims to provide a method, a system, a device and a medium for measuring gear tooth profile roughness. Surface roughness parameters are finally determined by fitting according to the Hertzian contact width of each tooth profile working point to accurately realize contact analysis for gears.

In order to achieve the objective, the present disclosure provides the following solution:

a method for measuring gear tooth profile roughness, including:

obtaining design parameters of a target gear pair and test parameters of each tooth profile working point when a driving gear and a driven gear in the target gear pair mesh; the design parameters include a teeth number of the driving gear, a teeth number of the driven gear, a modulus, a modification coefficient of the driving gear, a modification coefficient of the driven gear and a pressure angle; the test parameters include torque of the driving gear, a rotating speed of the driving gear and a center distance between the driving gear and the driven gear;

taking any one of gears in the target gear pair as a target gear, and measuring a tooth surface characteristic line of the target gear in a tooth profile direction to obtain a measured surface profile; the tooth surface characteristic line is a tooth profile line determined according to each tooth profile working point when the driving gear and the driven gear are meshed;

calculating the tooth surface characteristic line of the target gear in the tooth profile direction according to the design parameters to obtain a theoretical tooth profile curve;

fitting the measured surface profile and the theoretical tooth profile curve to obtain a surface structure curve;

calculating a Hertzian contact width of each tooth profile working point in a working area on the theoretical tooth profile curve according to the design parameters and the test parameters, and determining an evaluation length of surface roughness corresponding to each tooth profile working point according to the Hertzian contact width;

filtering the surface structure curve by means of a filter with a set wavelength to obtain a surface roughness profile; and determining surface roughness parameters of each tooth profile working point in the working area according to the surface roughness profile for each evaluation length; the surface roughness parameters are configured for characterizing bearing capacity of the target gear in the working area.

Optionally, the step of calculating a Hertzian contact width of each tooth profile working points in a working area on the theoretical tooth profile curve according to the design parameters and the test parameters specifically includes:

determining curvature radii according to the design parameters; the curvature radii include a curvature radius of the driving gear and a curvature radius of the driven gear;

determining tooth surface normal pressure according to the design parameters and the test parameters; and calculating the Hertzian contact width according to the curvature radii and the tooth surface normal pressure.

Optionally, the step of calculating the Hertzian contact width according to the curvature radii and the tooth surface normal pressure specifically includes:

$$b = \sqrt{\frac{4P}{\pi L} \frac{\frac{1-\mu_1^2}{E_1} \pm \frac{1-\mu_2^2}{E_2}}{\frac{1}{R_1} \pm \frac{1}{R_2}}}$$

wherein, b is the Hertzian contact width; P is the tooth surface normal pressure; $\mu_1$ is a Poisson's ratio of material of the driving gear; $\mu_2$ is a Poisson's ratio of material of the driven gear; $E_1$ is an elastic modulus of the material of the driving gear, $E_2$ is an elastic modulus of the material of the driven wheel; L is a tooth width; $R_1$ is the curvature radius of the driving gear; and $R_2$ is the curvature radius of the driven gear.

Optionally, the step of fitting the measured surface profile and the theoretical tooth profile curve to obtain a surface structure curve specifically includes:

fitting the measured surface profile and the theoretical tooth profile curve to obtain a fitting result; and performing subtraction processing on each tooth profile working point on the measured surface profile and a corresponding tooth profile working point on the theoretical tooth profile curve according to the fitting result to obtain the surface structure curve.

Optionally, the surface roughness parameters include arithmetic mean roughness and root-mean-square roughness.

the step of determining surface roughness parameters of each tooth profile working point in the working area according to the surface roughness profile for each evaluation length specifically includes:

$$R_a = \frac{1}{l}\int_0^l |y|dx = \frac{1}{n}\sum_{i=1}^n |y_i|$$

$$R_q = \sqrt{\frac{\sum_{i=1}^n y_i^2}{n}}$$

wherein, $R_a$ is the arithmetic mean roughness; $R_q$ is the root-mean-square roughness; l is the evaluation length; y is a set of roughness corresponding to each tooth profile working point on the surface roughness profile; n is a number of the tooth profile working points; i is a serial number of each tooth profile working point; $y_i$ is roughness of an i-th tooth profile working point; dx is an infinitely-small quantity in an integral interval of 0 to l.

Optionally, the method further includes:

determining a surface roughness parameter curve according to the surface roughness parameters in all working areas; the surface roughness parameter curve characterizes change of the bearing capacity of the target gear in the tooth profile direction.

Disclosed is a system for measuring gear tooth profile roughness. The system includes an obtaining module, a measuring module, a calculating module, a fitting module, a length-determining module, a filtering module and a parameter determining module.

The obtaining module is configured for obtaining design parameters of a target gear pair and test parameters of each tooth profile working point when a driving gear and a driven gear in the target gear pair are meshed. The design parameters include a teeth number of the driving gear, a teeth number of the driven gear, a modulus, a modification coefficient of the driving gear, a modification coefficient of the driven gear and a pressure angle. The test parameters include torque of the driving gear, rotating speed of the driving gear and a center distance between the driving gear and the driven gear.

The measuring module is configured for taking any one of gears in the target gear pair as a target gear and measuring a tooth surface characteristic line of the target gear in a tooth profile direction to obtain a measured surface profile. The tooth surface characteristic line is a tooth profile line determined according to each tooth profile working point when the driving gear and the driven gear mesh.

The calculating module is configured for calculating the tooth surface characteristic line of the target gear in the tooth profile direction according to the design parameters to obtain a theoretical tooth profile curve.

The fitting module is configured for fitting the measured surface profile and the theoretical tooth profile curve to obtain a surface structure curve.

The length-determining module is configured for determining module is configured calculating a Hertzian contact width of each tooth profile working point in a working area on the theoretical tooth profile curve according to the design parameters and the test parameters, and determining an evaluation length of surface roughness corresponding to each tooth profile working point according to the Hertzian contact width.

The filtering module is configured for filtering the surface structure curve by means of a filter with a set wavelength to obtain a surface roughness profile.

The parameter determining module is configured for determining a surface roughness parameters of each tooth profile working point in the working area according to the surface roughness profile for each evaluation length. The surface roughness parameters are configured for characterizing a bearing capacity of the target gear in the working area.

Disclosed is an electronic device. The electronic device includes a memory and a processor. The memory is configured for storing a computer program, and the processor runs the computer program so that the electronic device executes the method for measuring gear tooth profile roughness.

Disclosed is a non-volatile computer readable medium. The non-volatile computer readable medium stores a computer program. When the computer program is executed by a processor, the method for measuring gear tooth profile roughness is performed.

According to the specific embodiments provided by the present disclosure, the present disclosure has the following technical effects.

The present disclosure provides a method, a system, a device and a medium for measuring gear tooth profile roughness. The measured surface profile is obtained by measuring the tooth surface characteristic line, and the theoretical tooth profile curve is obtained by calculating the tooth surface characteristic line, and then the measured surface profile and the theoretical tooth profile curve are fitted to obtain the surface structure curve. Because the tooth surface characteristic line is the tooth profile line determined according to each tooth profile working point when the driving gear and the driven gear mesh, the surface roughness parameters are determined through the evaluation length determined by the theoretical tooth profile curve in combination with the surface roughness profile, so as to realize the contact analysis for gears. Because the determined surface roughness parameters are configured for characterizing the bearing capacity of the target gear in the working area, the contact analysis for gears can be accurately realized, and then the problem that a surface roughness characterization method is not completely consistent with the actual situation can be avoided.

BRIEF DESCRIPTION OF THE DRAWINGS

To describe the technical scheme in the embodiments of the present disclosure or in the prior art more clearly, the following briefly introduces the accompanying drawings required for describing the embodiments. Apparently, the accompanying drawings in the following description show merely some embodiments of the present disclosure, and those skilled in the art may still derive other drawings from these accompanying drawings without creative efforts.

FIG. 8 is a schematic diagram of a display interface of a display module provided by the embodiment of the present disclosure.

REFERENCE SIGNS 1, obtaining module; 2, measuring module; 3, calculating module; 4, fitting module; 5, length-determining module; 6, filtering module; and 7, parameter determining module.

DETAILED DESCRIPTION OF THE EMBODIMENTS

The following clearly and completely describes the technical solution in the present embodiments of the present disclosure with reference to the accompanying drawings in the present embodiments of the present disclosure. Apparently, the described embodiments are merely a part rather than all of the present embodiments of the present disclosure. Based on the embodiments in the present disclosure, all other embodiments obtained by a person of ordinary skill in the art under the premise of without contributing creative labor belong to the scope of the present disclosure.

In the meshing process of the gear pair, the contact is generally a point contact or line contact, and meshing points move in the tooth profile direction. The contact area of meshing points is usually calculated by a Hertzian contact theory.

The present disclosure aims to provide a method, a system, device and a medium for measuring gear tooth profile roughness. Surface roughness parameters are finally determined by fitting according to Hertzian contact width of tooth profile working points, so as to accurately realize contact analysis for gears.

To make the foregoing objective, features and advantages of the present disclosure clearer and more comprehensible, the present disclosure is further described in detail below concerning the accompanying drawings and specific embodiments.

Embodiment I

Figure 1:
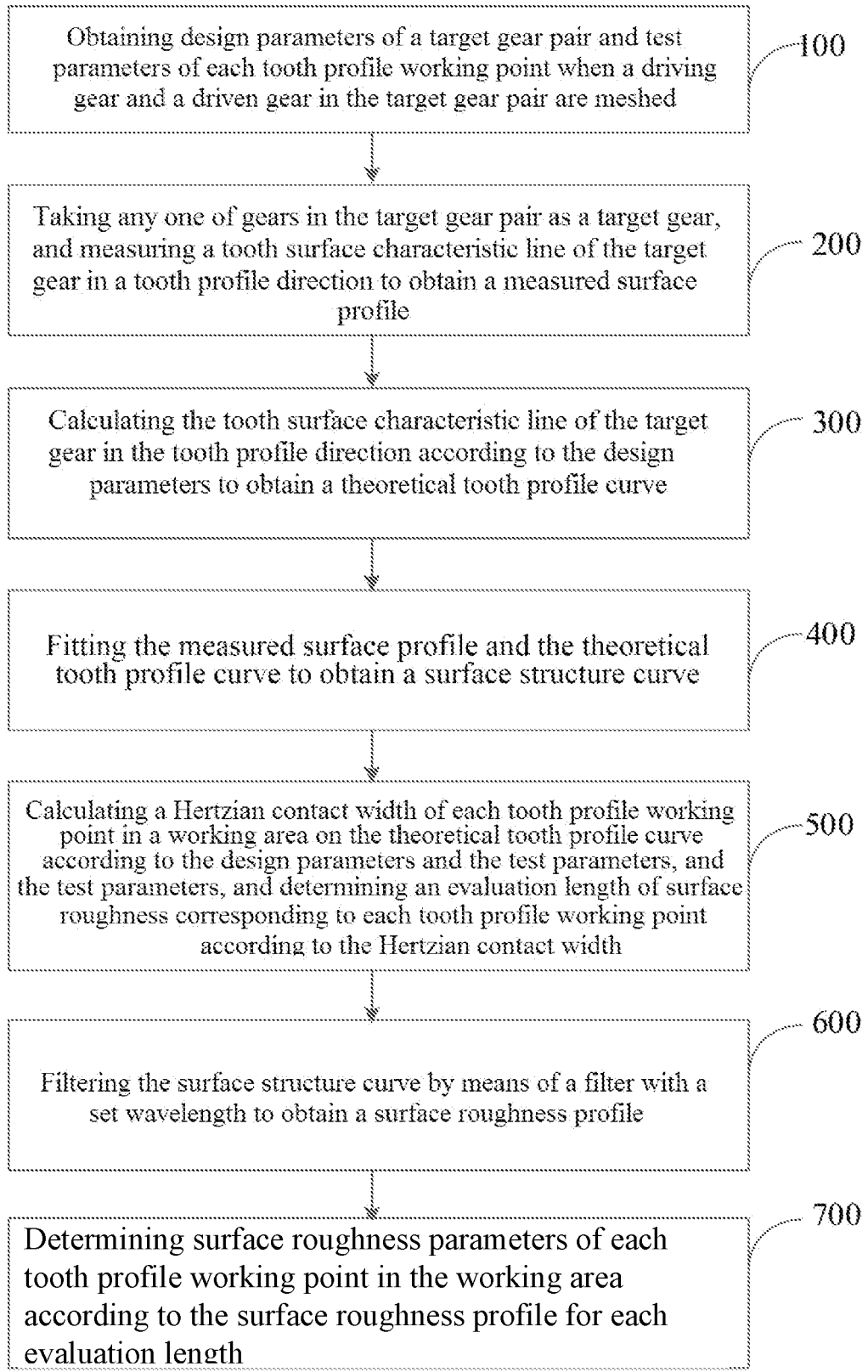
FIG. 1 is a flow diagram of a method for measuring gear tooth profile roughness provided by an embodiment of the present disclosure.

As shown in FIG. 1, the embodiment of the present disclosure provides a method for measuring gear tooth profile roughness. The method includes the following steps:

Step 100, obtaining design parameters of a target gear pair and test parameters of each tooth profile working point when a driving gear and a driven gear in the target gear pair mesh; the design parameters include the teeth number of the driving gear, the teeth number of the driven gear, a modulus, a modification coefficient of the driving gear, a modification coefficient of the driven gear and a pressure angle; the test parameters include torque of the driving gear, the rotating speed of the driving gear and a center distance between the driving gear and the driven gear.

Step 200, taking any one of the gears in the target gear pair as a target gear, and measuring a tooth surface characteristic line of the target gear in the tooth profile direction to obtain a measured surface profile; the tooth surface characteristic line is a tooth profile line determined according to each tooth profile working point when the driving gear and the driven gear are meshed.

Figure 2:
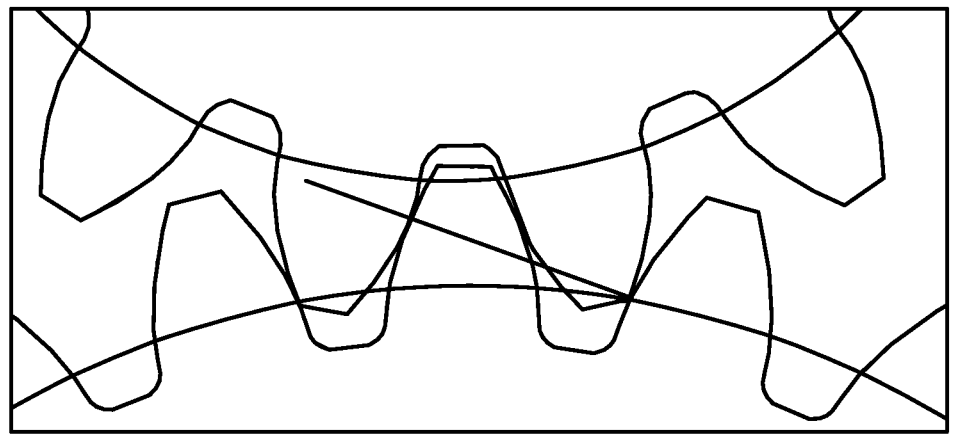
FIG. 2 is a schematic diagram of gear meshing provided by the embodiment of the present disclosure.
Figure 3:
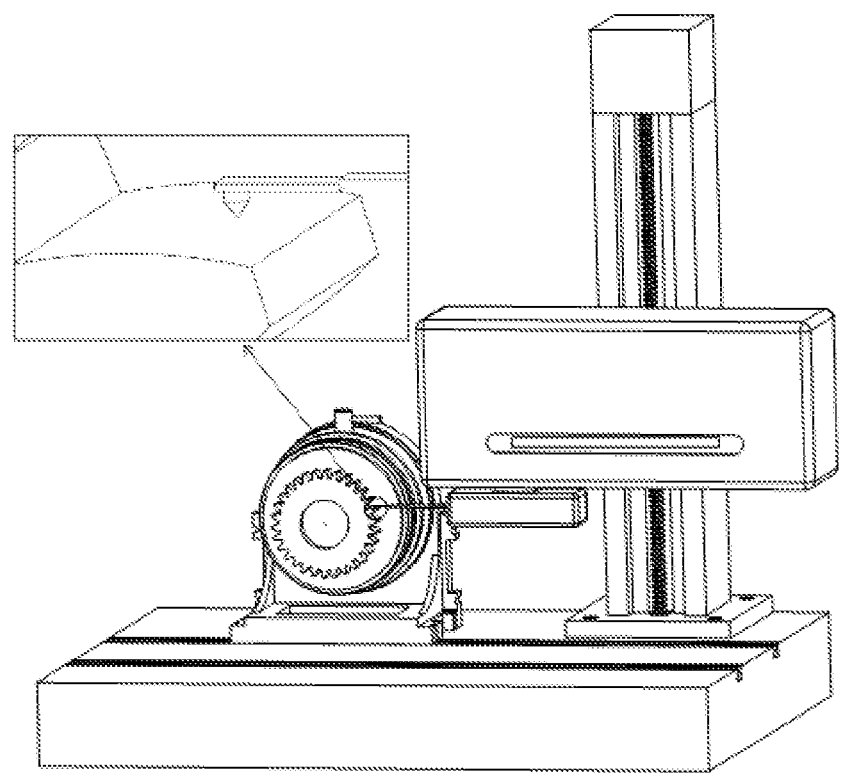
FIG. 3 is a schematic diagram of measurement by means of a roughness profile meter provided by the embodiment of the present disclosure.

Specifically, a tooth surface profile is measured in the tooth profile direction by means of a roughness profile meter, and a whole tooth profile working measurement area is covered with measurement length. An involute of the tooth profile is taken as the measurement area which needs to include a meshing starting point and a meshing ending point. Wherein, a schematic diagram of gear meshing is shown in FIG. 2. A schematic diagram of measurement by means of the roughness profile meter is shown in FIG. 3.

Step 300, calculating the tooth surface characteristic line of the target gear in the tooth profile direction according to the design parameters to obtain a theoretical tooth profile curve.

Step 400, fitting the measured surface profile and the theoretical tooth profile curve to obtain a surface structure curve. Namely, least square fitting is performed on the measured surface curve and the theoretical surface curve, and the surface structure curve is obtained after a macroscopic shape of the tooth profile is removed by filtering.

Step 500, calculating a Hertzian contact width of each tooth profile working point in a working area on the theoretical tooth profile curve according to the design parameters and the test parameters, and determining an evaluation length of surface roughness corresponding to each tooth profile working point according to the Hertzian contact width.

Specifically, the step of calculating a Hertzian contact width of each tooth profile working point in a working area on the theoretical tooth profile curve according to the design parameters and the test parameters includes:

determining curvature radii according to the design parameters; the curvature radii include a curvature radius of the driving gear and a curvature radius of the driven gear;

determining a tooth surface normal pressure according to the design parameters and the test parameters; and calculating the Hertzian contact width according to the curvature radii and the tooth surface normal pressure.

Figure 4:
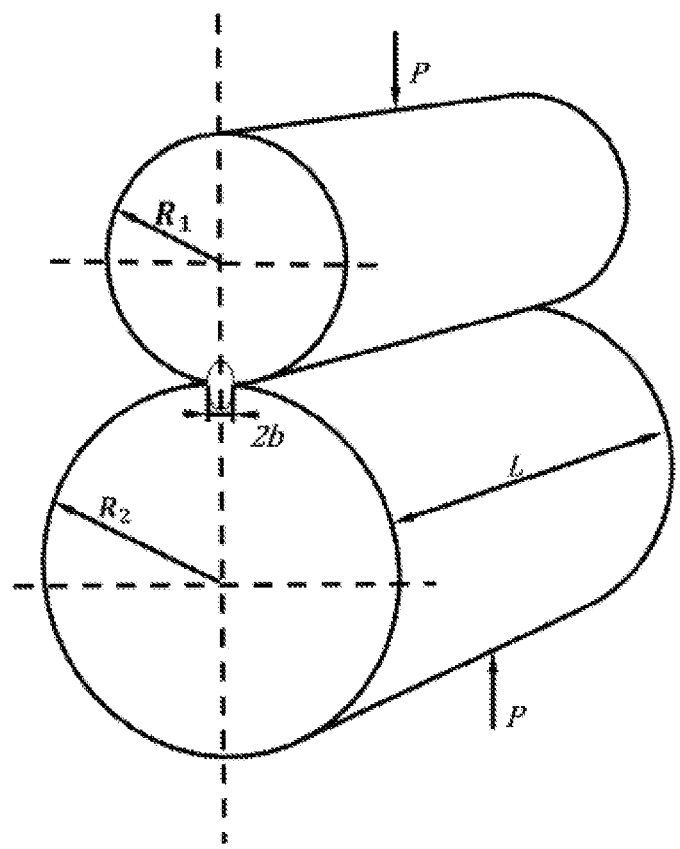
FIG. 4 is a schematic diagram of Hertzian contact provided by the embodiment of the present disclosure.

In short, on the tooth profile, from the meshing starting point to the meshing ending point, the calculation step is set according to each tooth profile working point, and the Hertzian contact width is calculated according to the design parameters and the test parameters. A schematic diagram of Hertzian contact is shown in FIG. 4.

Wherein, the step of calculating the Hertzian contact width according to the curvature radii and the tooth surface normal pressure specifically includes:

$$b = \sqrt{\frac{4P}{\pi L} \frac{\frac{1-\mu_1^2}{E_1} \pm \frac{1-\mu_2^2}{E_2}}{\frac{1}{R_1} \pm \frac{1}{R_2}}}$$

wherein, b is the Hertzian contact width; P is the tooth surface normal pressure; $\mu_1$ is a Poisson's ratio of material of the driving gear; $\mu_2$ is a Poisson's ratio of material of the driven gear; $E_1$ is an elastic modulus of the material of the driving gear, $E_2$ is an elastic modulus of the material of the driven wheel; L is a tooth width; $R_1$ is the curvature radius of the driving gear; and $R_2$ is the curvature radius of the driven gear. When the driving gear and the driven gear are in external meshing contact, the sign "+" is taken, and when the driving gear and the driven gear are in internal meshing contact, the sign "−" is taken.

The step of determining an evaluation length of surface roughness according to the Hertzian contact width specifically includes:

the Hertzian contact width is extended by its length in the tooth profile direction as the evaluation length of surface roughness. Because the Hertzian contact width is related to the normal pressure in a gear contact area, the evaluation length of surface roughness in the tooth profile direction is varied.

In short, every three local Hertz contact widths is taken as the evaluation length of surface roughness, and then the surface roughness parameter of the current position is calculated.

Step 600, filtering the surface structure curve by means of a filter with a set wavelength to obtain a surface roughness profile.

According to the evaluation process of surface roughness stipulated by the national standard, firstly, the cut-off wavelength of the filter for surface roughness is determined; wherein, the cut-off wavelength of a short-wave filter is $\lambda_s$; and the cut-off wavelength of a long-wave filter is $\lambda_c$. The cut-off wavelength should be selected according to the design grade of tooth profile surface roughness, and the corresponding long-wave and short-wave cut-off wavelengths should be selected according to the standard. After $\lambda_s$ and $\lambda_c$ are selected, when filtering operation is performed on different tooth profile surface structure curves of the gear tooth, the same cut-off wavelength is used, and microtopography curves with roughness information can be obtained.

Step 700, determining surface roughness parameters of each tooth profile working point in the working area according to the surface roughness profile for any one of the evaluation lengths; the surface roughness parameters are used for characterizing bearing capacity of the target gear in the working area.

The surface roughness parameters are calculated separately for each evaluation length, and the surface roughness parameter includes those commonly values such as $R_a$ and $R_q$ used in the calculation of the bearing capacity of the gear, or other parameters can be included.

The surface roughness parameters include arithmetic mean roughness and root-mean-square roughness. Wherein, the step of determining surface roughness parameters of each tooth profile working point in the working area according to the surface roughness profile for any one of the evaluation lengths specifically includes:

$$R_a = \frac{1}{l} \int_0^l |y| dx = \frac{1}{n} \sum_{i=1}^{n} |y_i|$$

$$R_q = \sqrt{\frac{\sum_{i=1}^{n} y_i^2}{n}}$$

wherein, $R_a$ is the arithmetic mean roughness; $R_q$ is the root-mean-square roughness; l is the evaluation length; y is a set of roughness corresponding to each tooth profile working point on the surface roughness profile; n is the number of the tooth profile working points; i is a serial number of the tooth profile working point; y is roughness of the i-th tooth profile working point; dx is an infinitely-small quantity in an integral interval of 0 to l.

As an optional implementation, the method further includes:

determining a surface roughness parameter curve according to the surface roughness parameters in all working areas; the surface roughness parameter curve characterizes the change of the bearing capacity of the target gear in the tooth profile direction.

Figure 5:
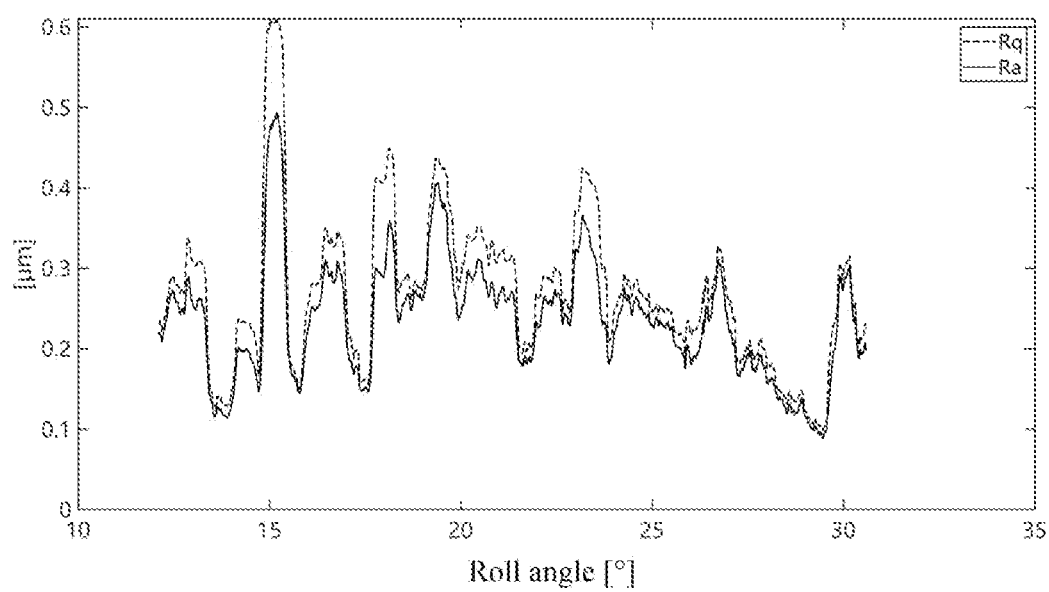
FIG. 5 is a schematic diagram of a characterization result of a tooth profile surface roughness provided by the embodiment of the present disclosure.

In the working area of the tooth profile, the surface roughness parameters of each tooth profile working point on the tooth profile such as the values of $R_a$ and $R_q$ are calculated in turn according to the application needs. By taking roll angle of the tooth profile as the horizontal coordinate and the surface roughness parameters as vertical coordinate, the surface roughness parameter curve drawn in the tooth profile direction characterizes tooth profile surface roughness. A schematic diagram of a characterization result of the tooth profile surface roughness is as shown in FIG. 5.

Figure 6:
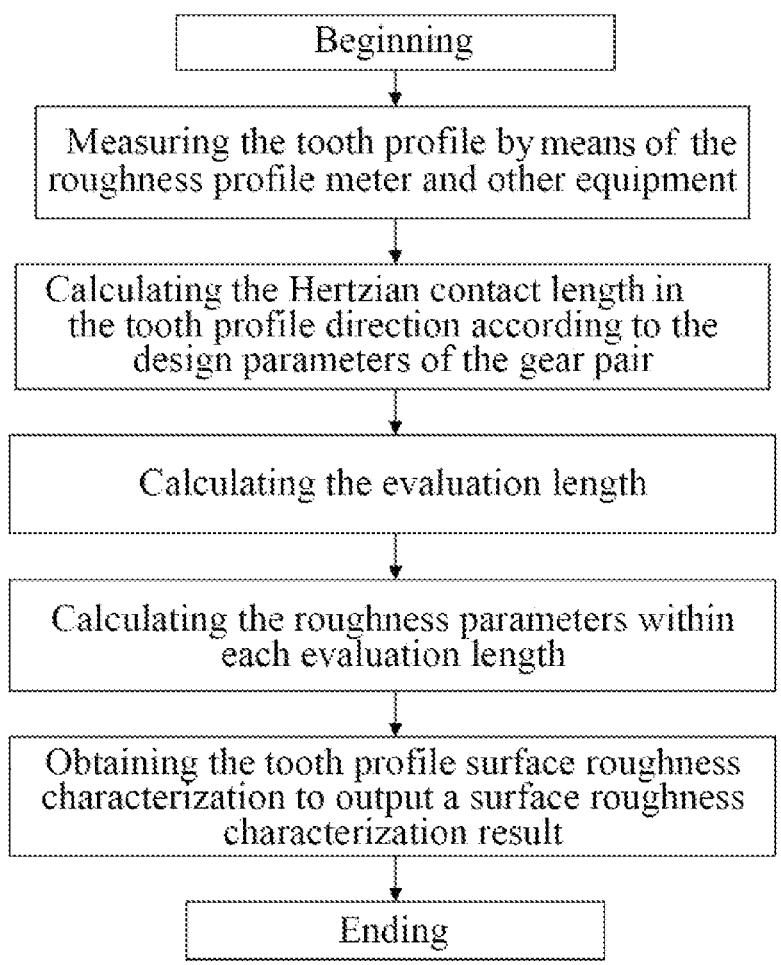
FIG. 6 is an operation procedure schematic diagram of a method for measuring gear tooth profile roughness in practical application provided by the embodiment of the present disclosure.

In addition, in practical application, the operation process of the present disclosure can also include: measuring the tooth profile by means of the roughness profile meter and other device; then calculating the Hertzian contact length in the tooth profile direction according to the design parameters of the gear pair, and then calculating the evaluation length; calculating the roughness parameters within each evaluation length, and then obtaining the tooth profile surface roughness characterization to output a characterization result of the surface roughness. A corresponding operation procedure schematic diagram is as shown in FIG. 6. The surface roughness parameters are used for subsequently calculating the bearing capacity of the gears and outputting the value of surface roughness, so that the bearing capacity of the gears can be characterized more intuitively.

Embodiment II

Figure 7:
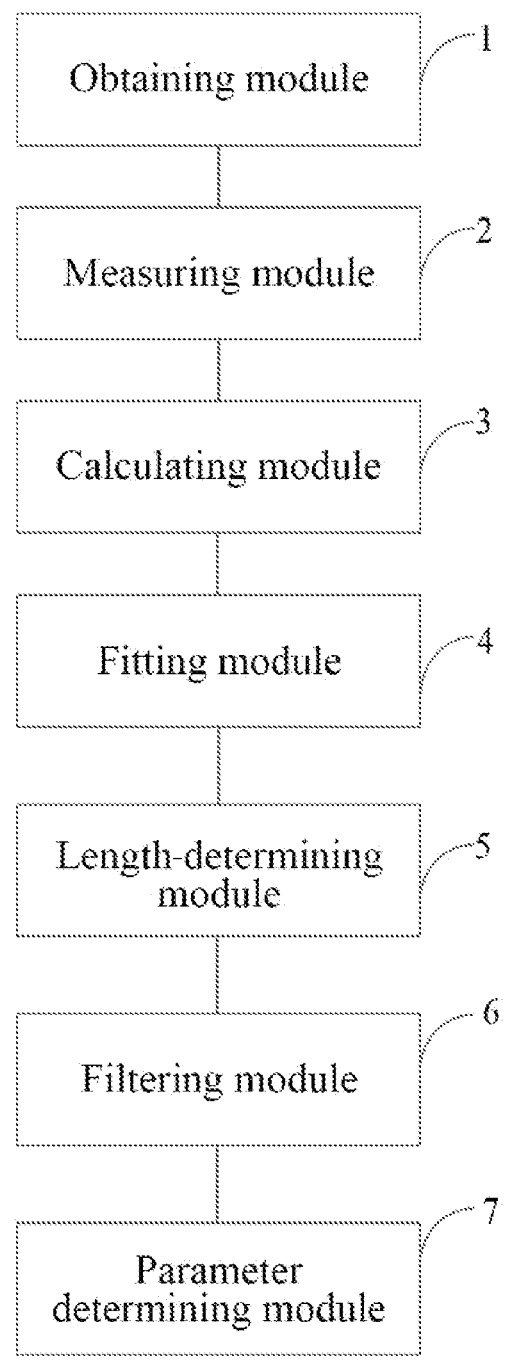
FIG. 7 is a structure chart of a system for measuring gear tooth profile roughness provided by the embodiment of the present disclosure.

As shown in FIG. 7, the embodiment of the present disclosure provides a system for measuring gear tooth profile roughness. The system includes an obtaining module 1, a measuring module 2, a calculating module 3, a fitting module 4, a length-determining module 5, a filtering module 6 and a parameter determining module 7.

The obtaining module 1 is configured for obtaining design parameters of a target gear pair and test parameters of each tooth profile working point when a driving gear and a driven gear in the target gear pair are meshed. The design parameters include the teeth number of the driving gear, the teeth number of the driven gear, a modulus, a modification coefficient of the driving gear, a modification coefficient of the driven gear and a pressure angle. The test parameters include torque of the driving gear, rotating speed of the driving gear and a center distance between the driving gear and the driven gear.

The measuring module 2 is configured for taking any one of gears in the target gear pair as a target gear, and measuring a tooth surface characteristic line of the target gear in the tooth profile direction to obtain a measured surface profile. The tooth surface characteristic line is a tooth profile line determined according to each tooth profile working point when the driving gear and driven gear are meshed.

The calculating module 3 is configured for calculating the tooth surface characteristic line of the target gear in the tooth profile direction according to the design parameters to obtain a theoretical tooth profile curve.

The fitting module 4 is configured for fitting the measured surface profile and the theoretical tooth profile curve to obtain a surface structure curve.

The length-determining module 5 is configured for calculating a Hertzian contact width of each tooth profile working point in a working area on the theoretical tooth profile curve according to the design parameters and the test parameters, and determining an evaluation length of surface roughness corresponding to each tooth profile working point according to the Hertzian contact width.

The filtering module 6 is configured for filtering the surface structure curve by means of a filter with a set wavelength to obtain a surface roughness profile.

The parameter determining module 7 is configured for determining a surface roughness parameters of each tooth profile working point in the working area according to the surface roughness profile for any one of the evaluation lengths. The surface roughness parameters are used for characterizing bearing capacity of the target gear in the working area.

In one embodiment, the system for measuring gear tooth profile roughness provided by the embodiment of the present disclosure also includes a display module.

The display module can display basic parameters of the gear pair, such as spiral angle, tip diameter, base diameter, and the modulus, the teeth number and the addendum modification coefficient in the design parameters. The display module can also display an transverse pressure angle and a working pressure angle.

On the basis of the above parameters, the display module can also display the arithmetic mean roughness $R_a$ and the root-mean-square roughness $R_q$ under the basic parameters of the gear pair, and can also display the corresponding roll angle. A schematic diagram of a display interface of the display module is as shown in FIG. 8.

Embodiment III

The embodiment of the present disclosure provides electronic device. The electronic device includes a memory and a processor. The memory is configured for storing a computer program, and the processor runs the computer program so that the electronic device executes the method for measuring gear tooth profile roughness in the embodiment I.

In one embodiment, the electronic device can be a server.

As an optional embodiment, the embodiment of the present disclosure also provides a non-volatile computer readable medium. The non-volatile computer readable medium stores a computer program. When the computer program is executed by a processor, the method for measuring gear tooth profile roughness in the embodiment I is performed.

All embodiments in this specification are described in a progressive manner. Each embodiment focuses on differences from other embodiments. For the part that is the same or similar between different embodiments, reference may be made between the embodiments. The system disclosed in the embodiment corresponds to the method disclosed in the embodiment, and therefore the description is relatively brief. Related information refers to descriptions of the related parts in the method.

Several examples are used for illustration of the principles and implementation methods of the present disclosure. The description of the embodiments is used to help illustrate the method and the core principles of the present disclosure; and meanwhile, those skilled in the art can make various modifications in terms of specific embodiments and scope of application in accordance with the teachings of the present disclosure. In conclusion, the content of this specification shall not be construed as a limitation to the present disclosure.

What is claimed is:

1. A method for measuring gear tooth profile roughness, comprising:

obtaining design parameters of a target gear pair and test parameters of each tooth profile working point when a driving gear and a driven gear in the target gear pair are meshed; the design parameters comprise a teeth number of the driving gear, a teeth number of the driven gear, a modulus, a modification coefficient of the driving gear, a modification coefficient of the driven gear and a pressure angle; the test parameters comprise torque of the driving gear, rotating speed of the driving gear and a center distance between the driving gear and the driven gear;

taking any one of gears in the target gear pair as a target gear, and measuring a tooth surface characteristic line of the target gear in a tooth profile direction to obtain a measured surface profile; the tooth surface characteristic line is a tooth profile line determined according to each tooth profile working point when the driving gear and the driven gear are meshed;

calculating the tooth surface characteristic line of the target gear in the tooth profile direction according to the design parameters to obtain a theoretical tooth profile curve;

fitting the measured surface profile and the theoretical tooth profile curve to obtain a surface structure curve;

calculating a Hertzian contact width of each tooth profile working point in a working area on the theoretical tooth profile curve according to the design parameters and the test parameters, and determining an evaluation length of surface roughness corresponding to each tooth profile working point according to the Hertzian contact width;

filtering the surface structure curve by means of a filter with a set wavelength to obtain a surface roughness profile; and determining surface roughness parameters of each tooth profile working point in the working area according to the surface roughness profile for each evaluation length; the surface roughness parameters are configured for characterizing bearing capacity of the target gear in the working area.

2. An electronic device, comprising a memory and a processor, wherein the memory is configured for storing a computer program, and the processor runs the computer program so that the electronic device executes the method for measuring gear tooth profile roughness according to claim 1.

3. A non-volatile computer readable medium, wherein the non-volatile computer readable medium stores a computer program, and when the computer program is executed by a processor, the method for measuring gear tooth profile roughness according to claim 1 is performed.

4. The method for measuring gear tooth profile roughness according to claim 1, wherein the step of fitting the measured surface profile and the theoretical tooth profile curve to obtain a surface structure curve specifically comprises:

fitting the measured surface profile and the theoretical tooth profile curve to obtain a fitting result; and performing subtraction processing on each tooth profile working point on the measured surface profile and a corresponding tooth profile working point on the theoretical tooth profile curve according to the fitting result to obtain the surface structure curve.

5. An electronic device, comprising a memory and a processor, wherein the memory is configured for storing a computer program, and the processor runs the computer program so that the electronic device executes the method for measuring gear tooth profile roughness according to claim 4.

6. A non-volatile computer readable medium, wherein the non-volatile computer readable medium stores a computer program, and when the computer program is executed by a processor, the method for measuring gear tooth profile roughness according to claim 4 is performed.

7. The method for measuring gear tooth profile roughness according to claim 1, wherein the surface roughness parameters comprise arithmetic mean roughness and root-mean-square roughness;

the step of determining surface roughness parameters of each tooth profile working point in the working area according to the surface roughness profile for each evaluation length specifically comprises:

$$R_a = \frac{1}{l}\int_0^l |y|dx = \frac{1}{n}\sum_{i=1}^{n}|y_i|$$

$$R_q = \sqrt{\frac{\sum_{i=1}^{n} y_i^2}{n}}$$

wherein, $R_a$ is the arithmetic mean roughness; $R_q$ is the root-mean-square roughness; l is the evaluation length; y is a set of roughness corresponding to each tooth profile working point on the surface roughness profile; n is a number of tooth profile working points; i is a serial number of each tooth profile working point; $y_i$, is a roughness of an i-th tooth profile working point; dx is an infinitely-small quantity in an integral interval of 0 to l.

8. An electronic device, comprising a memory and a processor, wherein the memory is configured for storing a computer program, and the processor runs the computer program so that the electronic device executes the method for measuring gear tooth profile roughness according to claim 7.

9. A non-volatile computer readable medium, wherein the non-volatile computer readable medium stores a computer program, and when the computer program is executed by a processor, the method for measuring gear tooth profile roughness according to claim 7 is performed.

10. The method for measuring gear tooth profile roughness according to claim 1, wherein the method further comprises:

determining a surface roughness parameter curve according to the surface roughness parameters in all working areas; the surface roughness parameter curve characterizes a change of the bearing capacity of the target gear in the tooth profile direction.

11. An electronic device, comprising a memory and a processor, wherein the memory is configured for storing a computer program, and the processor runs the computer program so that the electronic device executes the method for measuring gear tooth profile roughness according to claim 10.

12. A non-volatile computer readable medium, wherein the non-volatile computer readable medium stores a computer program, and when the computer program is executed by a processor, the method for measuring gear tooth profile roughness according to claim 10 is performed.

13. The method for measuring gear tooth profile roughness according to claim 1, wherein the step of calculating a Hertzian contact width of each tooth profile working point in a working area on the theoretical tooth profile curve according to the design parameters and the test parameters specifically comprises:

determining curvature radii according to the design parameters; the curvature radii comprise a curvature radius of the driving gear and a curvature radius of the driven gear;

determining tooth surface normal pressure according to the design parameters and the test parameters; and calculating the Hertzian contact width according to the curvature radii and the tooth surface normal pressure.

14. An electronic device, comprising a memory and a processor, wherein the memory is configured for storing a computer program, and the processor runs the computer program so that the electronic device executes the method for measuring gear tooth profile roughness according to claim 13.

15. A non-volatile computer readable medium, wherein the non-volatile computer readable medium stores a computer program, and when the computer program is executed by a processor, the method for measuring gear tooth profile roughness according to claim 13 is performed.

16. The method for measuring gear tooth profile roughness according to claim 13, wherein the step of calculating the Hertzian contact width according to the curvature radii and the tooth surface normal pressure specifically comprises:

$$b = \sqrt{\frac{4P}{\pi L}\frac{\frac{1-\mu_1^2}{E_1} \pm \frac{1-\mu_2^2}{E_2}}{\frac{1}{R_1} \pm \frac{1}{R_2}}}$$

wherein, b is the Hertzian contact width; P is the tooth surface normal pressure; $\mu_1$ is a Poisson's ratio of material of the driving gear; $\mu_2$ is a Poisson's ratio of material of the driven gear; $E_1$ is an elastic modulus of the material of the driving gear material, $E_2$ is an elastic modulus of the material of the driven wheel; L is a tooth width; $R_1$ is the curvature radius of the driving gear; and $R_2$ is the curvature radius of the driven gear.

17. An electronic device, comprising a memory and a processor, wherein the memory is configured for storing a computer program, and the processor runs the computer program so that the electronic device executes the method for measuring gear tooth profile roughness according to claim 16.

18. A non-volatile computer readable medium, wherein the non-volatile computer readable medium stores a computer program, and when the computer program is executed by a processor, the method for measuring gear tooth profile roughness according to claim 16 is performed.

19. A system for measuring gear tooth profile roughness, comprising an obtaining module, a measuring module, a calculating module, a fitting module, a length-determining module, a filtering module and a parameter determining module, wherein, the obtaining module is configured for obtaining design parameters of a target gear pair and test parameters of each tooth profile working point when a driving gear and a driven gear in the target gear pair are meshed; the design parameters comprise a teeth number of the driving gear, a teeth number of the driven gear, a modulus, a modification coefficient of the driving gear, a modification coefficient of the driven gear and a pressure angle; the test parameters comprise torque of the driving gear, rotating speed of the driving gear and a center distance between the driving gear and the driven gear;

the measuring module is configured for taking any one of gears in the target gear pair as a target gear, and measuring a tooth surface characteristic line of the target gear in a tooth profile direction to obtain a measured surface profile; the tooth surface characteristic line is a tooth profile line determined according to each tooth profile working point when the driving gear and the driven gear are meshed;

the calculating module is configured for calculating the tooth surface characteristic line of the target gear in the tooth profile direction according to the design parameters to obtain a theoretical tooth profile curve;

the fitting module is configured for fitting the measured surface profile and the theoretical tooth profile curve to obtain a surface structure curve;

the length-determining module is configured for calculating a Hertzian contact width of each tooth profile working point in a working area on the theoretical tooth profile curve according to the design parameters and the test parameters, and determining an evaluation length of surface roughness corresponding to each tooth profile working point according to the Hertzian contact width;

the filtering module is configured for filtering the surface structure curve by means of a filter with a set wavelength to obtain a surface roughness profile; and the parameter determining module is configured for determining surface roughness parameters of each tooth profile working point in the working area according to the surface roughness profile for each evaluation length; the surface roughness parameters are configured for characterizing a bearing capacity of the target gear in the working area.

* * * * *